(12) United States Patent
Jurkovic et al.

(10) Patent No.: US 8,884,485 B2
(45) Date of Patent: Nov. 11, 2014

(54) AXIALLY ASYMMETRIC PERMANENT MAGNET MACHINE

(75) Inventors: Sinisa Jurkovic, Sterling Heights, MI (US); Khwaja M. Rahman, Troy, MI (US); Xinyu Zhou, Troy, MI (US); Xu Han, Novi, MI (US); Qiang Niu, Novi, MI (US)

(73) Assignee: GM Global Technology Operations, Detroit, MI (US)

( * ) Notice: Subject to any disclaimer, the term of this patent is extended or adjusted under 35 U.S.C. 154(b) by 276 days.

(21) Appl. No.: 13/448,508

(22) Filed: Apr. 17, 2012

(65) Prior Publication Data

US 2013/0270952 A1    Oct. 17, 2013

(51) Int. Cl.
*H02K 21/12*    (2006.01)

(52) U.S. Cl.
USPC .................................. 310/156.53; 310/156.47

(58) Field of Classification Search
USPC ........................................ 310/156.01–156.84
See application file for complete search history.

(56) References Cited

U.S. PATENT DOCUMENTS

| 7,067,948 | B2 * | 6/2006 | Yamaguchi et al. | 310/156.47 |
|---|---|---|---|---|
| 7,474,029 | B2 | 1/2009 | Rahman et al. | |
| 7,847,461 | B2 | 12/2010 | Rahman et al. | |
| 7,969,058 | B2 | 6/2011 | Rahman et al. | |
| 8,368,273 | B2 * | 2/2013 | Hino et al. | 310/156.47 |
| 8,536,748 | B2 * | 9/2013 | Liang et al. | 310/156.53 |
| 2009/0140592 | A1 | 6/2009 | Rahman et al. | |
| 2009/0140593 | A1 | 6/2009 | Kaiser et al. | |
| 2010/0026128 | A1 * | 2/2010 | Ionel | 310/156.53 |
| 2010/0213781 | A1 | 8/2010 | Rahman et al. | |
| 2011/0001382 | A1 * | 1/2011 | Leonardi et al. | 310/156.53 |
| 2011/0037339 | A1 | 2/2011 | Rahman et al. | |
| 2012/0248918 | A1 * | 10/2012 | Itou et al. | 310/156.48 |

* cited by examiner

*Primary Examiner* — Hanh Nguyen
(74) *Attorney, Agent, or Firm* — Quinn Law Group, PLLC

(57) ABSTRACT

A permanent magnet machine is provided with a rotor positioned at least partially within a stator. The rotor includes first and second ring segments oriented axially around a central axis. The rotor defines first and second configurations in the first and second ring segments, respectively. The first configuration is sufficiently different from the second configuration such that torque ripple may be minimized. A first layer of slots, defining a slot outer edge, may be formed in the rotor. In one embodiment, a stator-to-slot gap varies between the first and second ring segments. In another embodiment, a stator-rotor gap varies between the first and second ring segments. In another embodiment, a bridge thickness varies between the first and second ring segments. Thus the rotor exhibits axial asymmetry.

15 Claims, 2 Drawing Sheets

US 8,884,485 B2

AXIALLY ASYMMETRIC PERMANENT MAGNET MACHINE

TECHNICAL FIELD

The present invention relates generally to electric machines, and more particularly, to the configuration of an interior permanent magnet machine.

BACKGROUND

An interior permanent magnet machine generally includes a rotor having a plurality of magnets of alternating polarity around the outer periphery of the rotor. The rotor is rotatable within a stator which generally includes a plurality of windings and magnetic poles of alternating polarity. Permanent magnet machines may produce undesirable torque ripple, resulting in unwanted vibration and noise. Traditionally, the configuration of the rotor in interior permanent magnet machines is axially symmetric.

SUMMARY

A permanent magnet machine is provided with a rotor positioned at least partially within a stator. The rotor includes first and second ring segments oriented axially around a central axis. The rotor defines a first configuration in the first ring segment and a second configuration in the second ring segment. The first configuration is sufficiently different from the second configuration such that torque ripple may be minimized. The rotor may include a third ring segment defining a third configuration. The third configuration may be different from both the first and the second configurations. Thus the rotor exhibits axial asymmetry.

The rotor defines a rotor outer profile while the stator defines a stator inner profile. A stator-rotor gap is defined between the rotor outer profile and the stator inner profile. The stator-rotor gap may vary between the first and second ring segments. A rotor radius is defined between the central axis of the rotor and the rotor outer profile. The rotor radius may vary between the first and second ring segments.

A first layer of slots, defining a slot outer edge, is formed in the rotor. A stator-to-slot gap is defined between the slot outer edge and the stator inner profile. The stator-to-slot gap may vary between the first and second ring segments.

A bridge thickness is defined between the slot outer edge and the rotor outer profile. The bridge thickness may vary between the first and second ring segments. In one embodiment, the bridge thickness varies while the air gap is uniform between the ring segments. In one embodiment, the bridge thickness is uniform while the air gap varies between the ring segments.

A first and a second layer of slots may be formed in the rotor. The first layer of slots is located at a first distance from the center axis in the first ring segment and at a second distance from the center axis in the second ring segment. The second layer of slots is located at a third distance from the center axis in the first ring segment and at a fourth distance from the center axis in the second ring segment. The first, second, third and fourth distances may be different from one another.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

DETAILED DESCRIPTION

Figure 1:
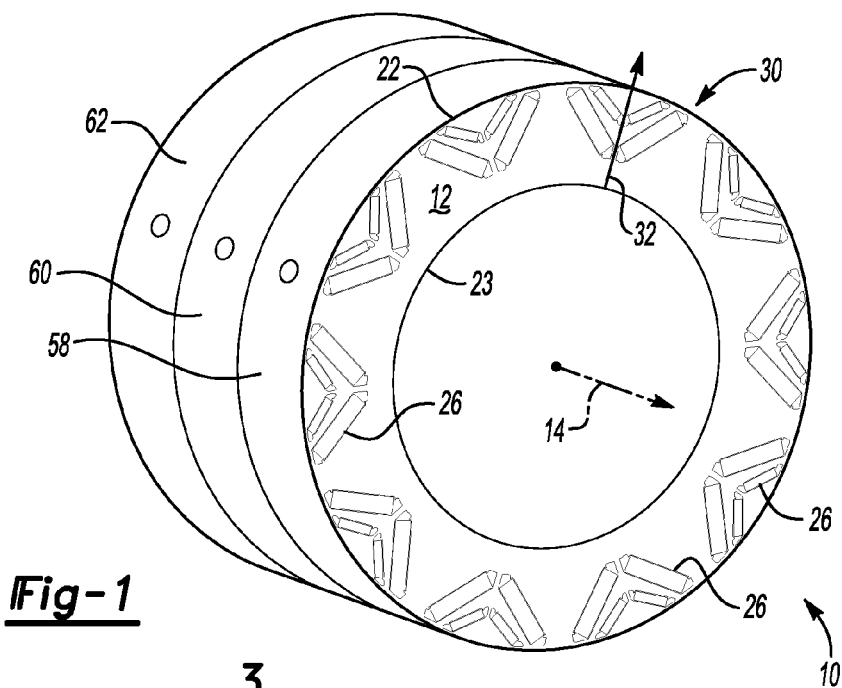
FIG. 1 is a schematic partial perspective view of an interior permanent magnet machine showing a rotor but not a stator.
Figure 2:
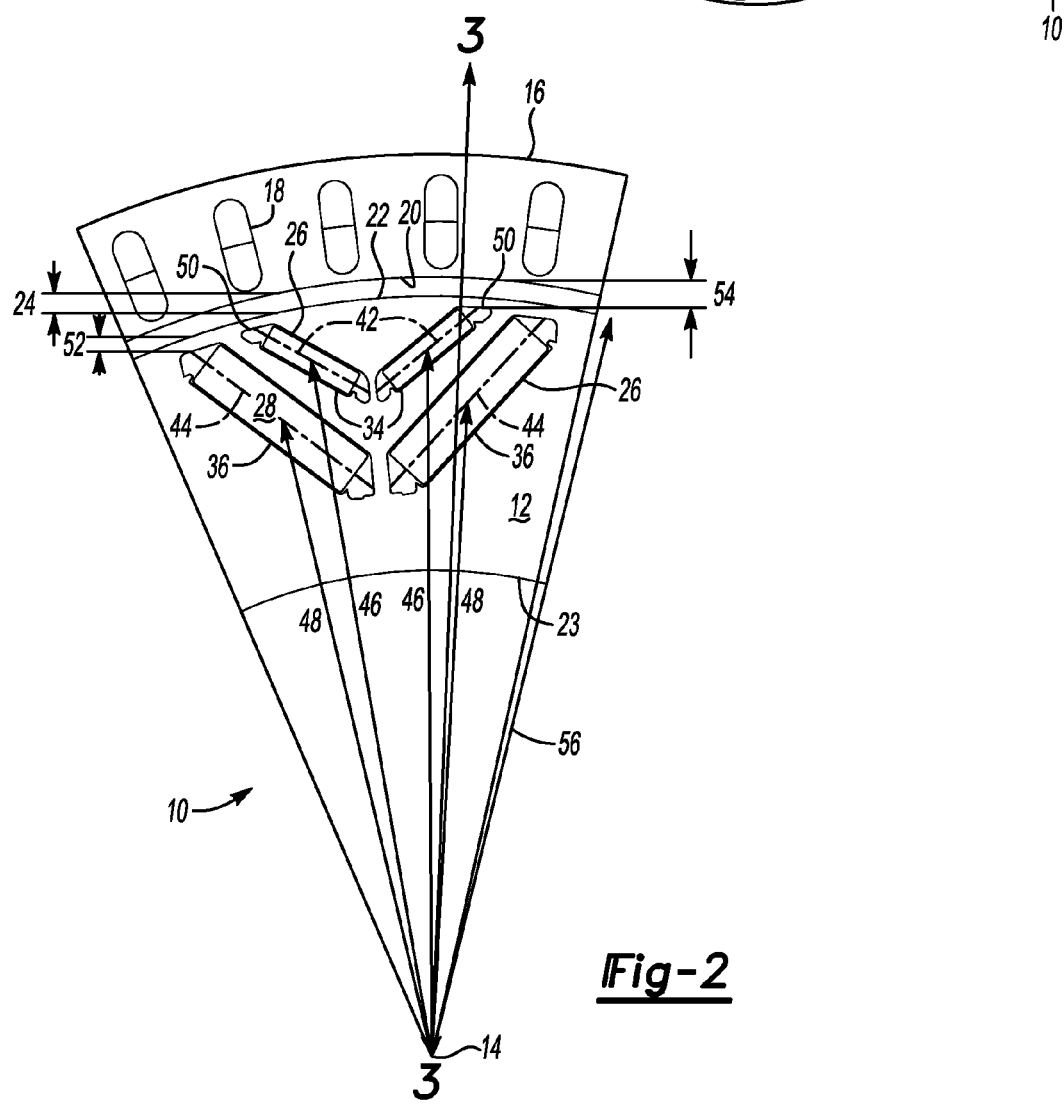
FIG. 2 is a schematic partial cross-sectional view through the rotor shown in FIG. 1 and including a stator.
Figure 3:
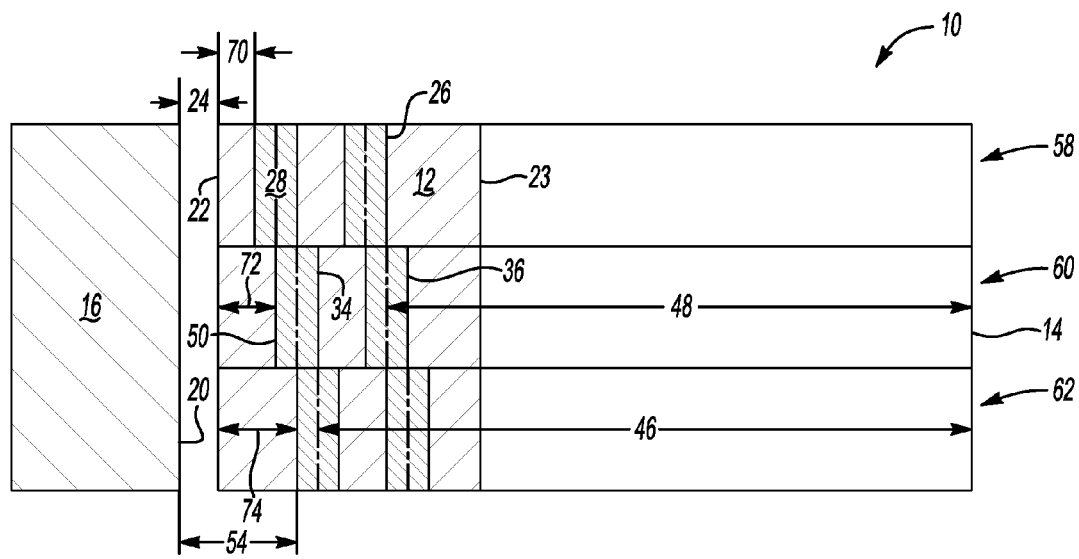
FIG. 3 is a schematic partial cross-sectional view along axis 3-3 of the machine shown in FIG. 2, in accordance with a first embodiment.
Figure 4:
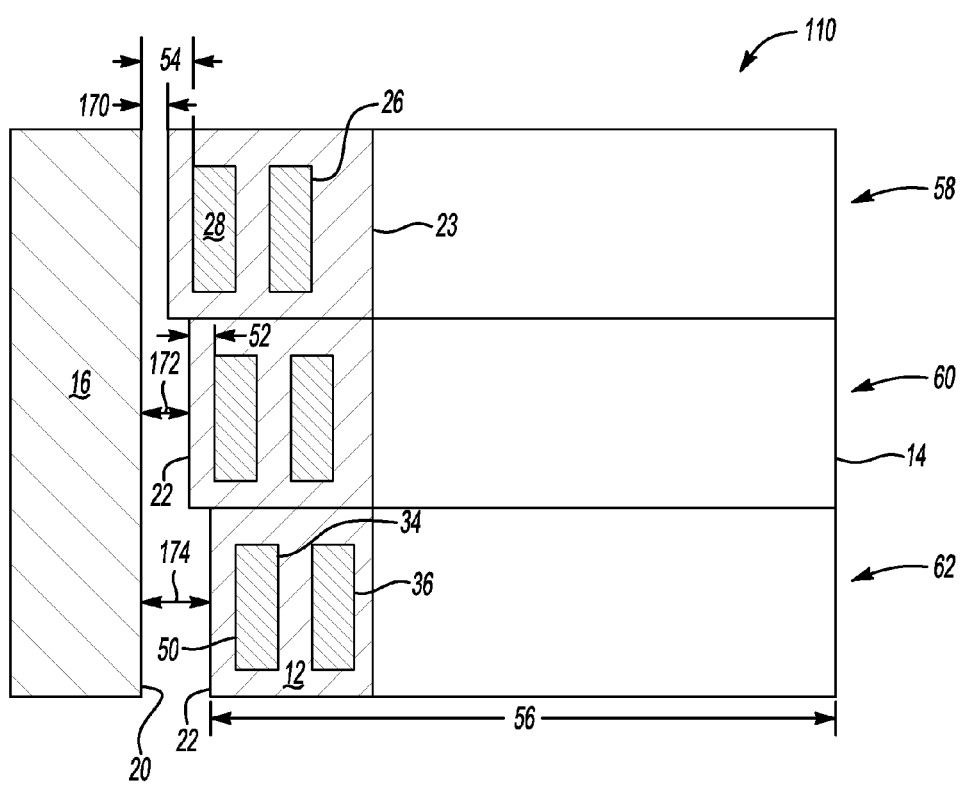
FIG. 4 is a schematic partial cross-sectional view along axis 3-3, in accordance with a second embodiment.

Referring to the Figures, wherein like reference numbers refer to the same or similar components throughout the several views, FIG. 1 is a schematic partial perspective view of an interior permanent magnet machine 10 having a rotor 12 arranged around a center axis 14. FIG. 2 is a schematic partial cross-sectional view through the rotor 12. Referring to FIG. 2, the rotor 12 is rotatable within a generally annular stator 16 (not shown in FIG. 1) having a plurality of windings 18. FIGS. 3-4 are schematic partial cross-sectional views through axis 3-3 shown in FIG. 2, in accordance with two embodiments of the present disclosure. Referring to FIGS. 2-4, the stator 16 defines a stator inner profile 20 while the rotor 12 defines a rotor outer profile 22 and a rotor inner profile 23. An air gap 24 (between the stator 16 and rotor 12) is defined between the rotor outer profile 22 and the stator inner profile 20.

Referring to FIGS. 1-4, the rotor 12 is formed with a plurality of slots 26 that extend into the rotor 12 and define a three-dimensional volume having any suitable shape. All or a portion of the slots 26 may be filled with permanent magnets 28. Referring to FIG. 1, the rotor 12 includes a plurality of poles 30, defined by respective pole axes, one of which is generally indicated by reference numeral 32. The slots 26 may be configured to be symmetric relative to the pole axis 32. Each pole 30 is formed at least in part by the magnets 28 in the slots 26. In the embodiment shown, the rotor 12 has ten poles 30, however, it may be formed with any number of poles or slots.

Referring to FIGS. 2-4, the slots 26 may be arranged in a radially-outer first layer 34 and a radially-inner second layer 36. The first and second layers 34, 36 may be formed with any number of slots 26. Referring to FIG. 2, each of the slots 26 in the first layer 34 defines a first centerline 42. Each of the slots 26 in the second layer 36 defines a second centerline 44. Referring to FIGS. 2-3, the first layer 34 is located at a first radial distance 46 from the first centerline 42 to the center axis 14. The second layer 36 is located at a second radial distance 48 from the second centerline 44 to the center axis.

Referring to FIG. 2, the slots 26 in the first and second layers 34, 36 define a slot outer edge 50 near the rotor outer profile 22. A bridge thickness 52 is defined between the slot outer edge 50 and the rotor outer profile 22, as shown in FIGS. 2-4. The bridge thickness 52 may be the same for the first and second layers 34, 36. Referring to FIGS. 2-4, a stator-to-slot gap 54 is defined between the slot outer edge 50 and the stator inner profile 20. A rotor radius 56 is defined between the rotor outer profile 22 and the central axis 14, as shown in FIGS. 2-4.

Referring to FIGS. 1, 3 and 4, the rotor 12 may divided into at least two ring segments oriented axially around a central axis 14. For illustrative purposes, the rotor 12 is shown with first, second and third ring segments 58, 60 and 62; however any number of ring segments may be used. In other words, the rotor 12 may have 'n' ring segments, where 'n' can be any integer. As shown in FIG. 1, the ring segments 58, 60 and 62 are shaped in the form of an annulus or ring. The second ring segment 60 is axially adjacent to the first and third ring segments 58, 62. The rotor 12 is configured to have an axially asymmetric configuration, i.e., a different configuration in at least two of the ring segments 58, 60, 62. The axially asymmetric configuration is described with respect to two embodiments: a first embodiment shown in FIG. 3 and a second embodiment shown in FIG. 4.

The bridge thickness 52 (defined between the slot outer edge 50 and the rotor outer profile 22 and shown in FIG. 2) may be different in the first, second and third ring segments 58, 60, 62. In the first embodiment shown in FIG. 3, the first ring segment 58 has a first bridge thickness 70. The second ring segment 60 has a second bridge thickness 72 which is different from the first bridge thickness 70. The third ring segment 62 has a third bridge thickness 74, which may be different from both the first and second bridge thicknesses 70, 72. In one example, the first, second and third bridge thicknesses 70, 72, 74 are 1.2 mm, 1.5 mm and 1.6 mm, respectively. In the embodiment shown in FIG. 3, the air gap 24 (defined between the rotor outer profile 22 and the stator inner profile 20) may be uniform along the ring segments 58, 60, 62.

Referring to FIG. 2-3, positions of the first and second layers 34, 36 of slots 26 relative to the central axis 14 (through the first and second radial distances 46, 48 described above) may be different in the first, second and third ring segments 58, 60, 62. In one example, the first radial distance 46 is 95 mm, 94 mm and 93 mm in the first, second and third ring segments 58, 60, 62, respectively. In one example, the second radial distance 48 is 92 mm, 90 mm and 88 mm in the first, second and third ring segments 58, 60, 62, respectively.

The air gap 24 (defined between the rotor outer profile 22 and the stator inner profile 20 and shown in FIG. 2) is configured to vary between the first, second and third ring segments 58, 60, 62. Referring to FIG. 4, the second embodiment shows a machine 110 where the first ring segment 58 has a first air gap 170. The second ring segment 60 has a second air gap 172 which is different from the first air gap 170. The third ring segment 62 has a third air gap 174, which may be different from both the first and second air gaps 170, 172. In one example, the first, second and third air gaps 170, 172, 174 are 1.0 mm, 0.6 mm and 0.8 mm, respectively.

Stated in another way, the rotor radius 56 (shown in FIG. 2) may be configured to vary between the first, second and third ring segments 58, 60, 62. In one example, the rotor radius 56 is 99.8 mm, 100.2 mm and 100.4 mm in the first, second and third ring segments 58, 60, 62, respectively. In the embodiment shown in FIG. 4, the bridge thickness 52 (defined between the slot outer edge and the rotor outer profile FIG. 2) may be uniform along the first, second and third ring segments 58, 60, 62.

Referring to FIGS. 2-4, in both embodiments, the stator-to-slot gap 54 may be configured to vary between the first, second and third ring segments 58, 60, 62. As shown in FIGS. 2-4, the stator-to-slot gap 54 (defined between the slot outer edge 50 and the stator inner profile 20) is a sum of the air gap 24 (defined between the rotor outer profile 22 and the stator inner profile 20) and the bridge thickness 52 (defined between the slot outer edge 50 and the rotor outer profile 22). In one example, the stator-to-slot gap 54 is 1.3 mm, 1.5 mm and 1.7 mm in the first, second and third ring segments 58, 60, 62, respectively.

In summary, the rotor 12 defines a first configuration in the first ring segment 58 and a second configuration in the second ring segment 60. Each configuration may be defined by parameters such as, but not limited to, bridge thickness 52, air gap 24, rotor radius 56, stator-slot gap 54, and first and second radial distances 46, 48 (position of slots 26 in the first and second layers 34, 36). The first and second configurations are sufficiently different from one another in order to minimize torque ripple. The torque pulsation created by the first ring segment 58 may be reduced by the counter torque pulsation created by the second ring segment 60, thereby minimizing torque. A third configuration may be defined in the third ring segment 62, which may be different from both the first and second configurations.

The parameters described above such as bridge thickness 52, air gap 24, rotor radius 56, stator-slot gap 54, and first and second radial distances 46, 48 (of the first and second layers 34, 36 of slots 26) may be optimized to obtain the desired level of averaging for torque ripple reduction. The parameters may be optimized in any combination, that is, some parameters kept constant and some parameters kept as variables. This optimization may be performed empirically or through conventional computer modeling methods known in the art. By way of example only, Design of Expebridgeents (DOE) is a methodology for setting up a set of virtual or physical expebridgeents in which input variables are varied in a systematic manner, for the purpose of determining the correlation between input variables and to predict results or output, as opposed to the one-factor-at-a-time method. For example, the bridge thickness 52 in the rotor 12 may be varied and the output or torque ripple produced observed for resultant changes. In one example, the optimization may be set up with the objective that the torque ripple is between 2 and 5 Newton-meters ("Nm"). The torque ripple may be defined as the difference between the minimum and maximum torque generated during one cycle or revolution. Optionally, the optimization may be set up with the constraint that the minimum average torque generated by the machine is at least 100 Nm. Another constraint may be that the total energy loss in the system is less than or equal to 100 kilo Joules. Another constraint may be that the electromotive force or induced voltage is greater than or equal to 30 Volts.

While the best modes for carrying out the invention have been described in detail, those familiar with the art to which this invention relates will recognize various alternative designs and embodiments for practicing the invention within the scope of the appended claims.

The invention claimed is:

1. A permanent magnet machine comprising:
   a stator defining a stator inner profile;
   a rotor positioned at least partially within the stator and defining a rotor outer profile;
   wherein the rotor includes a first and a second ring segment oriented axially around a central axis;
   a rotor radius defined between the central axis of the rotor and the rotor outer profile;
   wherein the rotor radius varies between the first and second ring segments;
   wherein the rotor defines a first and a second configuration in the first and second ring segments, respectively; and
   wherein the first configuration is sufficiently different from the second configuration to minimize torque ripple.

2. The machine of claim 1, further comprising:
   a third ring segment axially adjacent to the second ring segment;
   wherein the rotor defines a third configuration in the third ring segment; and wherein the third configuration is different from both the first and the second configurations.

3. The machine of claim 1, further comprising:
a first layer of slots defining a slot outer edge and formed in the rotor;
a stator-to-slot gap defined between the slot outer edge and the stator inner profile; and
wherein the stator-to-slot gap varies between the first and second ring segments.

4. The machine of claim 3, wherein the stator-to-slot gap is 1.3 mm and 1.7 mm in the first and the second ring segments, respectively.

5. The machine of claim 1, further comprising:
a first layer of slots defining a slot outer edge and formed in the rotor;
a first bridge thickness defined between the slot outer edge and the rotor outer profile in the first ring segment;
a second bridge thickness defined between the slot outer edge and the rotor outer profile in the second ring segment; and
wherein the first bridge thickness is different from the second bridge thickness.

6. The machine of claim 5, further comprising:
a third ring segment axially adjacent to the second ring segment;
a third bridge thickness defined between the slot outer edge to the rotor outer profile in the third ring segment;
wherein the first, second and third bridge thicknesses are each different from one another.

7. The machine of claim 6, wherein the first, second and third bridge thicknesses are 1.2 mm, 1.5 mm and 1.6 mm, respectively.

8. The machine of claim 1, further comprising:
a first and a second layer of slots formed in the rotor;
wherein the first layer of slots is located a first distance from the center axis in the first ring segment and a second distance from the center axis in the second ring segment;
wherein the second layer of slots is located a third distance from the center axis in the first ring segment and a fourth distance from the center axis in the second ring segment; and
wherein the first, second, third and fourth distances are each different from one another.

9. The machine of claim 1, further comprising an air gap defined between the rotor outer profile and the stator inner profile, wherein the air gap varies between the first and second ring segments.

10. A permanent magnet machine comprising:
a stator defining a stator inner profile;
a rotor positioned at least partially within the stator and defining a rotor outer profile;
wherein the rotor includes a first and a second ring segment oriented axially around a central axis;
a first layer of slots formed in the rotor and defining a slot outer edge;
a stator-to-slot gap defined between the slot outer edge and the stator inner profile; and
wherein the stator-to-slot gap varies between the first and second ring segments;
an air gap defined between the rotor outer profile and the stator inner profile, wherein the air gap varies between the first and second ring segments.

11. The machine of claim 10, wherein the stator-to-slot gap is 1.3 mm in the first ring segment and 1.7 mm in the second ring segment.

12. The machine of claim 10, further comprising:
a first bridge thickness defined between the slot outer edge to the rotor outer profile in the first ring segment;
a second bridge thickness defined between the slot outer edge to the rotor outer profile in the second ring segment; and
wherein the first and the second bridge thickness are different from one another.

13. The machine of claim 12, wherein the first and the second bridge thicknesses are 1.2 mm and 1.6 mm, respectively.

14. The machine of claim 12, further comprising an air gap defined between the rotor outer profile and the stator inner profile, wherein the air gap is uniform between the first and second ring segments.

15. A permanent magnet machine comprising:
a stator defining a stator inner profile;
a rotor positioned at least partially within the stator and defining a rotor outer profile;
wherein the rotor includes a first and a second ring segment oriented axially around a central axis;
a first and a second layer of slots formed in the rotor;
wherein the first layer of slots is located a first distance from the center axis in the first ring segment and a second distance from the center axis in the second ring segment;
wherein the second layer of slots is located a third distance from the center axis in the first ring segment and a fourth distance from the center axis in the second ring segment; and
wherein the first, second, third and fourth distances are each different from one another;
wherein the rotor defines a first and a second configuration in the first and second ring segments, respectively; and
wherein the first configuration is sufficiently different from the second configuration to minimize torque ripple.

* * * * *